United States Patent [19]
Jensen

[11] 3,891,987
[45] June 24, 1975

[54] ONE-OPERATION SIGNAL PROCESSOR

[75] Inventor: Garold K. Jensen, Alexandria, Va.

[73] Assignee: The United States of America as represented by the Secretary of the Navy, Washington, D.C.

[22] Filed: Sept. 18, 1969

[21] Appl. No.: 862,632

[52] U.S. Cl. .............. 343/5 R; 343/5 DP; 343/9
[51] Int. Cl.² ....................... G01S 7/06; G01S 9/02
[58] Field of Search ................. 343/5, 5 DP, 8, 9

[56] References Cited
UNITED STATES PATENTS

| | | | |
|---|---|---|---|
| 3,072,857 | 1/1963 | Thaler | 343/8 X |
| 3,140,486 | 7/1964 | Gillmer | 343/8 |

*Primary Examiner*—Malcolm F. Hubler
*Attorney, Agent, or Firm*—R. S. Sciascia; Arthur L. Branning

[57] ABSTRACT

Data processing system for radar wherein all stored target information is virtually instantaneously and continuously analyzed and displayed. Readout of range-separated, stored video signals is further separated into narrow band frequency channels, each of which have identical discriminators that are connected to energize displays for constant velocity targets and displays showing the velocity and rate of velocity change for accelerating targets.

6 Claims, 6 Drawing Figures

FIG. 2
(a) 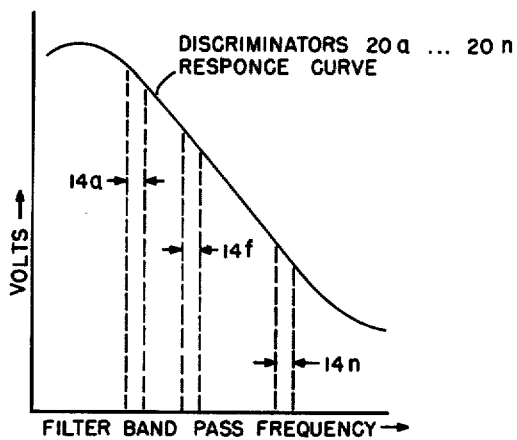
(b) 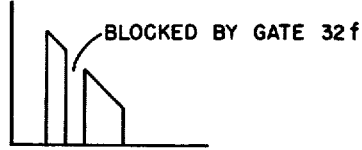
(c) 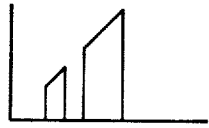
(d) 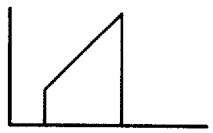
(e) 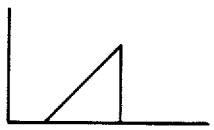
INVENTOR
GAROLD K. JENSEN

ONE-OPERATION SIGNAL PROCESSOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

For many obvious reasons, much money and effort have been spent on the development of extremely long range radars. The development of powerful transmitters, appropriate antennas, extremely sensitive receivers and highly successful retrieval circuitry has progressed at such a remarkable rate that modern radars are capable of providing information so rapidly and in such magnitude that the known systems which display and otherwise utilize this information have been unable to satisfactorily provide the desired results in the short time allowed by the latest high velocity targets.

SUMMARY OF THE INVENTION

The general purpose of this invention is to provide an improved data processing and display system for radar which can very rapidly process and display large amounts of information, i.e. radar return. More specifically, the present invention contemplates storing the radar return by range, further separating the stored data into frequency channels, each of which includes identical discriminators and using the discriminator outputs to energize a display which shows the range and velocity parameters of constant velocity targets and to energize displays which show the range, velocity and acceleration of non-constant velocity targets.

OBJECTS OF THE INVENTION

It is therefore an object of this invention to provide an improved data processing and display system for radar.

Another object is to provide an improved data processing system for radar which is capable of very rapidly processing and displaying large amounts of data.

A still further object of the invention is to provide an improved data processing and display system for radar which is capable of very rapidly processing and displaying large amounts of radar return and wherein the radar return is initially stored according to range and is then further separated into frequency channels, each of which includes discriminators having identical response characteristics, the output of the discriminators being utilized, after further processing, to energize displays showing the parameters of constant and non-constant velocity targets.

DESCRIPTION OF THE DRAWINGS

Other objects and advantages of the invention will hereinafter become more fully apparent from the following description and the annexed drawings, which illustrate a preferred embodiment, and wherein:

FIGS. 2a–2e contains diagrams which are helpful in understanding the invention.

DESCRIPTION OF THE PREFERRED EMBODIMENT

Figure 1:
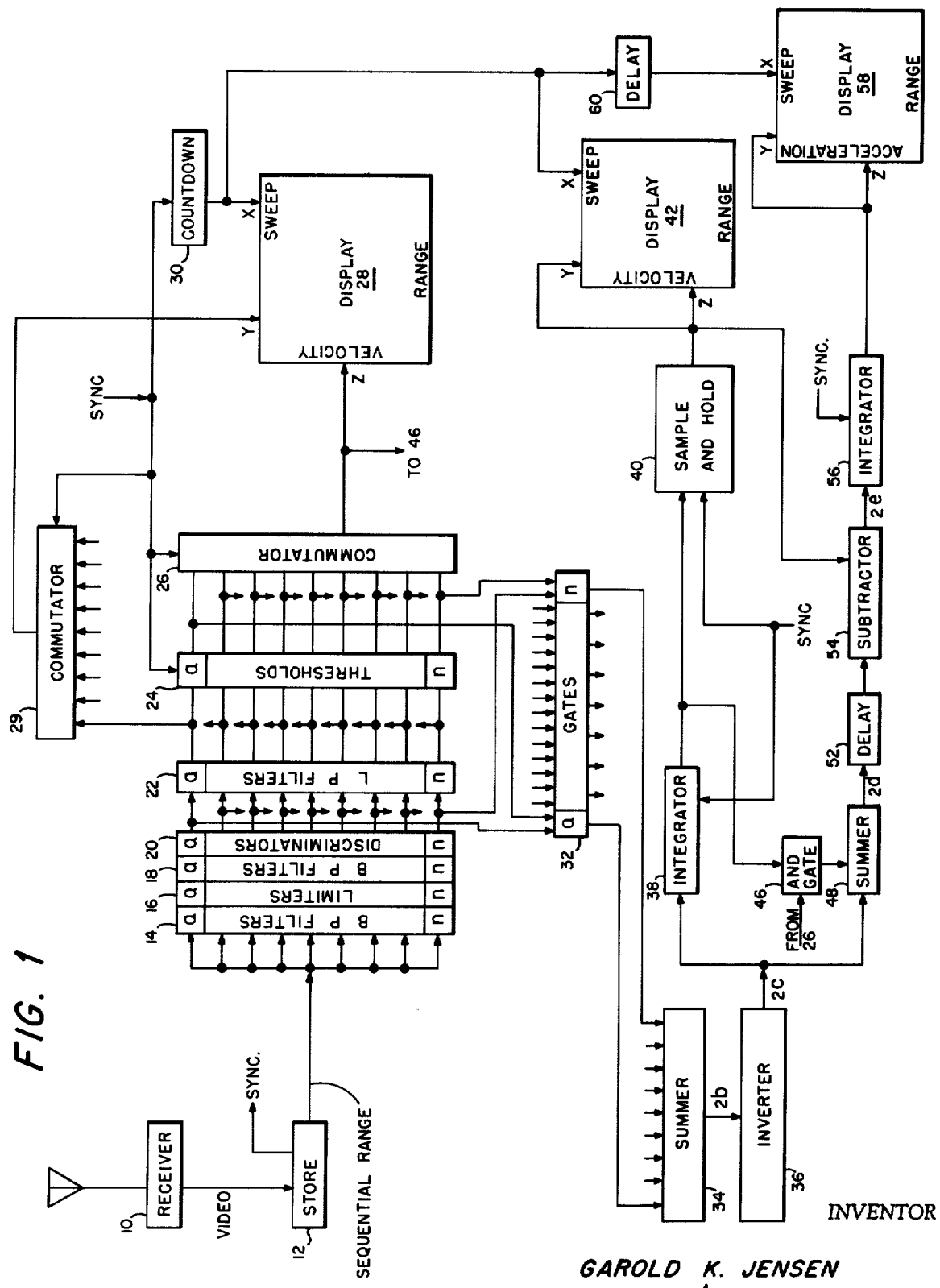
FIG. 1 illustrates the invention in block diagram form.

Referring now to FIG. 1, the receiver 10 is connected to a store 12 wherein the radar return, which has been reduced to the doppler content, is separated and stored by range, i.e. target distance, in a manner such that once the storage device 12 is filled, the older information is erased as new information is added. The operation and structure of receiver 10 and storage device 12, as described, is well known and does not (per se) form a part of the present information.

The output of storage device 12 is a continuous and rapid sequential readout by range of the doppler information stored and is connected to the filter system $14a$ ... $14n$ wherein the pass bands of the individual filters are contiguous and collectively span the doppler frequency band of receiver 10. Storage device 12 also produces a sync signal, for uses to be described later, at the conclusion of the readout of each range.

The filter system $14a$ ... $14n$ can be thought of as further separating, i.e. placing into processing channels according to doppler frequency content, the already range-sequenced receiver output signals. The processing frequency channels set up by filters $14a$ ... $14n$ each include limiters $16a$ ... $16n$ that function to limit the amplitude of the signals in any channel and contiguous band pass filters $18a$ ... $18n$ which are similar to the associated filters $14a$ ... $14n$. Filters $18a$ ... $18n$ function to remove any harmonic frequency that may be introduced by the limiters $16a$ ... $16n$. These processing frequency channels each also include identical discriminators $20a$ ... $20n$, all of which have frequency response curves similar to that shown in FIG. 2a which curve is, as shown, approximately linear in the doppler frequency band of receiver 10 and the pass bands of filters $14a$ ... $14n$ and $18a$ ... $18n$.

Discriminators $20a$ ... $20n$ are connected to low pass narrow band filters $22a$ ... $22n$ that function to remove most of the high frequency noise which may have been introduced at the antenna. Filters $22a$ ... $22n$ are in turn connected to threshold devices $24a$ ... $24n$ which function to produce an output signal of predetermined amplitude and duration whenever a predetermined amount of energy is received during a range readout from the storage device 12. The threshold devices $24a$ ... $24n$ are energy controlled so that no threshold output signal will be produced unless the associated discriminator $20a$ ... $20n$ produces an output during substantially the whole duration of a range readout from storage device 12. In other words, only a substantially constant velocity target or constant frequency interference (jamming) will cause the threshold devices $24a$ ... $24n$ to produce an output signal. The outputs of thresholds $24a$ ... $24n$ are connected to a high speed commutator 26 which completes the sequency of sampling the outputs of each threshold device $24a$ ... $24n$ during each range readout by storage device 12. Commutator 26 is connected to the Z (intensity) grid of a conventional cathode ray tube (CRT) display device 28. The outputs of filters $22a$ ... $22n$ are also connected to commutator 29, which is similar to commutator 26. Commutator 29 is connected to the Y or vertical input (representative of velocity) of CRT 28. The X or horizontal sweep (representative of range) of CRT 28 is synchronized (by the obvious countdown circuitry 30) to the complete, i.e. all ranges, readout of storage device 12. As shown in FIG. 1, the sampling by commutators 26 and 29 and the energy integration periods of thresholds $24a$ ... $24n$ are also synchronized by the "sync" signal from the storage 12.

The cooperative functioning of the described apparatus which comprises the constant velocity display portion of the invention will now be described with reference being made to numerical parameters of a typical radar embodiment of the invention. The reader will, of course, realize that such numerical parameters are used merely for descriptive purposes and that obviously other numerical radar configurations could be used and are also contemplated by the invention.

A commutator (not shown) which is included in storage device 12, and which is synchronized with the radar transmitter, sequentially connects the video output signal of receiver 12 to different portions (range bins) of storage 12 in a way such that the range bins are always full and the oldest stored information is erased and replaced by the newest video signal information. Typically the storage device 12 may have 250 range bins which are read out sequentially and at a very rapid rate. The readout of storage device 12 is connected to the parallel processing frequency channels that typically can be 20 in number (i.e. $n = 20$). Each of the 20 processing frequency channels have band passes which are 200 KC wide. These band passes are contiguous and collectively span the total expected doppler band (as modified by the time-compression frequency changing by the rapid readout of store 12).

Each of the processing frequency channels $a \ldots n$ contain one of the filters $14a \ldots 14n$ which passes into the channel only the signal components having frequencies which are included in the pass band of the particular channel. The filter is followed by a limiter $16a \ldots 16n$ that limits the amplitude of the signal in the channel and is in turn followed by another filter $18a \ldots 18n$, similar to the filter $14a \ldots 14n$, that removes any harmonic components which are produced by the limiters $16a \ldots 16n$.

Each of the processing frequency channels $a \ldots n$ further include a discriminator $20a \ldots 20n$. All of these discriminators have, as nearly as possible, identical frequency response characteristics which, as shown in FIG. 2a, are substantially linear throughout the expected doppler band. After passing through filters $22a \ldots 22n$ which remove high frequency noise, the outputs of the discriminators are connected to thresholds $24a \ldots 24n$. The discriminators are synchronized with the range readouts of the storage device 12 and produce an output only if, during any one range readout, there is a substantially continuous signal (of appreciable magnitude) in the particular channel $a \ldots n$ associated with the particular threshold. Such signals occur only as a result of a substantially constant velocity target or as a result of constant frequency interference (jamming). The commutator 26 is synchronized with the range readout of the storage device 12 and sequentially connects the outputs of thresholds $24a \ldots 24n$ to the intensity input of CRT display 28. Similarly, the commutator 29 is synchronized with the storage device 12 and sequentially connects the outputs of filters $22a \ldots 22n$ to the vertical input of CRT 28. The horizontal sweep of CRT 28 is synchronized with the readout of storage device 12. Thus, bright dots, representative of a constant velocity target (or jamming) appear on the face of the CRT 28 in a position wherein the vertical location is representative of velocity and the horizontal location is representative of range.

The invention also contemplates and provides for the display of accelerating (non-constant velocity) targets.

For this purpose the outputs of discriminators $20a \ldots 20n$ are connected to the inputs of gates $32a \ldots 32n$ which are connected to be controlled by the outputs of thresholds $24a \ldots 24n$. More specifically, in the absence of a signal from one of the threshold devices $24a \ldots 24n$, the gates $32a \ldots 32n$ pass all of the signals from the discriminators $20a \ldots 20n$ to the summer 34. If one of the thresholds $24a \ldots 24n$ is energized to produce an output signal, this signal will close the associated gate $32a \ldots 32n$ and block the signal from the associated discriminator $20a \ldots 20n$ from summer 34. In FIG. 2b, the waveform output of summer 34 is illustrated for an assumed incident in which the radar return included an accelerating target and either jamming or the reflection from a constant velocity target which caused the energization of threshold device $24f$.

Summer 34 is connected to inverter 36 which, in customary manner, transforms the waveform of FIG. 2b into that shown in FIG. 2c, wherein the reader will particularly notice the persisting gap caused by the assumed signal from threshold $24f$. Inverter 36 is in turn connected through an integrator 38 and a sample and hold device 40 to the intensity or Z input of CRT display device 42. The output of sample and hold device 40 is also connected to the vertical or Y (representative of velocity) input of display device 42, the horizontal or X (representative of range) sweep input of which is connected to countdown circuit 30 to be synchronized with the total (all ranges) readout of storage device 12. Integrator 38 and sample and hold device 40 are also connected to be synchronized with the single range readout (sync) signal of storage device 12, i.e. the integrator 38 integrates the inverted summer signal over the period of a single range readout and the sample and hold device 40 transfers the result of this integration to the Z and Y inputs of display device 42.

Integrator 38 is also connected through AND gate 46 to one input of summer 48. The AND gate is opened, and thereupon passes the signal from integrator 38 to the summer 48, by a coincident signal from commutator 26. Inverter 36 is also connected to the other input of summer 48 which functions to combine the inverter signal i.e. waveform of FIG. 2c, with the portion of the signal from integrator 38 passed by gate 46, the combined signal (i.e. the output of summer 48) being essentially continuous as illustrated by the waveform in FIG. 2d. Summer 48 is connected through delay 52 to a subtracting circuit 54, the other input of which is the output signal of sample and hold device 40. Subtractor 54 is connected to the synchronized integrator 56, the output of which is connected to both the intensity or Z input and to the vertical or Y (representative of acceleration) input of CRT display device 58. The horizontal or X (representative of range) sweep input of display device 58 is connected through a delay circuit 60, which has a delay period similar to that of delay 52, to the countdown circuit 30, to be thereby synchronized, with delay, to the total (all ranges) readout of storage device 12.

Those portions of the invention relating to the velocity-range display 42 and to the acceleration-range display 58 will now be described. For convenience of description, it will be assumed that in the particular range readout by storage device 12 under consideration, the stored radar return results from, and is indicative of, two targets; the first of which is a constant velocity target, such as an airplane, that produces a continuous doppler signal that energizes threshold 24*f*, closes gate 32*f* and is displayed on CRT 28 and the second of which is a highly accelerating target, such as a missile shortly after lift-off, that produces a varying frequency doppler signal which energizes many of the discriminators 20*a* . . . 20*n* to produce (in different incremental time periods) output signals which are related to the discriminator response curve illustrated in FIG. 2*a*. These discriminator output signals are combined by summer 34 to form a signal having a waveform such as is shown in FIG. 2*b*, the waveform having a gap because of the closing of gate 32*f* as a result of the first target. By inversion in component 36, the summer signal is changed from the waveform of FIG. 2*b* to that of FIG. 2*c*, which also includes a gap.

The reader will, of course, recognize that the height and slope of the waveform of FIG. 2*c* are respectively related to the velocity and acceleration of the second target, the greater the height the larger the velocity and the steeper the slope the higher the acceleration.

The gap in the waveform of FIG. 2*d* produces only a minor discrepancy in the result of the integration (over the range readout period) by component 38, the resultant value of which is sampled and held by component 40 and is indicative of the average velocity of the second target during the period for which data is stored in store 12. Both the integrator 38 and the sample and hold device 40 are synchronized by the single range readout signal produced by storage device 12, i.e. the sync signal. The integrated value held by component 40 is connected to the intensity and velocity inputs of display 42, the range (horizontal) sweep of which is synchronized to the total (i.e. all range) readout of storage device 12. The CRT 42 constantly displays all stored information relating to non-constant velocity targets, the display being in the form of bright dots, the vertical location of which is indicative of average target velocity and the horizontal location of which is indicative of target range.

It has been found that customary procedures of integration or differentiation do not provide satisfactorily accurate indications of second target acceleration when the output of inverter 36 includes the constant velocity (first target) gap shown in the waveform of FIG. 2*c*. For this reason an increment of the output of integrator 38 is combined in summer 48 with the output of the inverter 36 to essentially remove the gap and thereby change the waveform of FIG. 2*c* to that of FIG. 2*d*. This combination of the outputs of integrator 38 and inverter 36 is controlled by AND gate 46 and occurs only when there is a gap in the output of inverter 36.

It has also been found that the best indication of second target acceleration is obtained by integrating (rather than differentiating) procedures, largely because the previously described elimination of the gap in the output of inverter 36 (FIG. 2*c*) does not always produce an entirely even sloping surface in the waveform of FIG. 2*d*. Furthermore, it has been found that the sensitivity of the integrating procedure can be advantageously increased by integrating the area of the wave form of FIG. 2*d* which relates to acceleration, i.e. the area associated with the slope, to the exclusion of the area associated with the second target velocity, i.e. the basic height of the waveform of FIG. 2*d*. To implement this concept, the output of summer 48 is delayed by component 52 for a period of time equal to the single range readout period of storage 12. After this delay, the output of summer 48 and the output of sample and hold device 40 are subtractively combined in component 54 to produce the waveform shown in FIG. 2*e*, which is then integrated over the single range readout period of store 12 by the synchronized integrator 56. The output of integrator 56 is connected to the intensity Z and acceleration Y inputs of display 58, the range (horizontal) sweep of which is similarly delayed by component 60 and synchronized to the total (i.e. all range) readout of storage device 12. The CRT 58 constantly displays all stored information relating to non-constant velocity targets, the display being in the form of bright streaks, the vertical location of which is indicative of acceleration and the horizontal location of which is indicative of range.

There has been disclosed an improved data processing and display system for radar which is capable of very rapidly processing and displaying large amounts of radar return information and wherein the radar return is initially stored according to range and is then further separated into frequency channels, each of which includes discriminators having identical response characteristics, the output of the discriminators being utilized to energize displays showing the velocity and acceleration parameters plotted against range for both constant and non-constant velocity targets. Further, and in contrast to other modern radars which often require millions of operations to process and display all of the stored information, the present invention is limited solely by the rapidity of the readout of storage device 12 and requires only a single such readout of device 12 to display (on a continuing basis) all of the stored information.

Obviously many modifications and variations of the present invention are possible in the light of the above teachings. For example, among many such expedients, it would both be obvious to and within the capability of a person skilled in the electronic arts, that a repeated range readout could be utilized rather than the delay procedure embodied in component 52. For these reasons, it is to be understood, that within the scope of the appended claims, the invention may be practiced otherwise than as specifically described.

What is claimed and desired to be secured by Letters Patent of the United States is:

1. A data processing and display system for radar comprising:

storage means for storing radar return information in a range ordered manner and for producing a sequential range readout signal representative of said information;

a plurality of processing frequency channels connected in parallel to receive said sequential range readout signal, each of said processing frequency channels including a band pass filter, a discriminator and a threshold device connected in series;

each of said band pass filters having a pass band different from the pass band of the other of said filters;

each of said discriminators having frequency response characteristics substantially identical to the frequency response characteristics of the other of said discriminators;

each of said threshold devices producing an output signal only if the output of said series connected discriminator exceeds a predetermined energy level, and display means connected to said plurality of processing frequency channels and functioning to display by range the velocity and acceleration parameters of constant velocity and non-constant velocity targets as contained in said stored radar return information.

2. The data processing and display system of claim 1 wherein the pass bands of said band pass filters are contiguous, one with another, and collectively span a predetermined frequency range which encompasses the expected frequency range of the readout signal of said storage means.

3. The data processing and display system of claim 2 wherein said display means includes:
- a first cathode ray tube (CRT) device having an intensity input and first and second orthogonal inputs, said first orthogonal input being connected to be synchronized with the sequential range readout signal of said storage means;
- first commutator means connected to the outputs of each of said threshold devices and functioning to sequentially connect individual ones of said threshold device outputs to the intensity input of said first CRT device;
- second commutator means connected to the inputs of each of said threshold devices and functioning to sequentially connect individual ones of said threshold device inputs to said second orthogonal CRT input;
- whereby said first CRT device displays constant velocity target information from the readout of said storage means in the form of bright dots, the location of said dots in one orthogonal display direction being indicative of target range and the location of said dots in the other orthogonal direction being indicative of target velocity.

4. The data processing and display system of claim 3 wherein said display means further includes:
- a second cathode ray tube (CRT) device having an intensity input, a directional input and an orthogonal direction sweep input, said orthogonal direction sweep input being connected to be synchronized with the sequential range readout signal of said storage means;
- a summer connected to the outputs of said discriminators;
- an integrator connected to said summer and
- a sample and hold device connected to said integrator and producing an output signal which is connected to said second CRT intensity and directional inputs;
- whereby said second CRT device displays non-constant velocity target information from the readout of said storage means in the form of bright dots, the location of said dots in one orthogonal display direction being indicative of target velocity and the location of said dots in the other orthogonal direction being indicative of target range.

5. The data processing and display system of claim 4 wherein said display means further includes:
- a third cathode ray tube (CRT) device having an intensity input, a directional input and an orthogonal direction sweep input;
- first and second delay means, each of which function to delay electrical signals a predetermined period of time, said first delay means being connected to said summer and said second delay means being connected between the orthogonal direction sweep inputs of said second and third CRT devices;
- a subtractor connected to said first delay means and to said sample and hold device and
- a second integrator connected to said subtractor and producing an output signal which is connected to said third CRT intensity and directional inputs
- whereby said third CRT device displays non-constant velocity target information from the readout of said storage means in the form of bright streaks, the location of said streaks in one orthogonal display direction being indicative of target acceleration and the location of said streaks in the other orthogonal direction being indicative of target range.

6. In a data processing and display system for radar wherein the receiver video doppler signal is stored in range order and, upon readout, is further separated by frequency into a plurality of channels, each of which includes a discriminator and a threshold device that produces an output only when energized by a discriminator output signal in excess of a certain strength, such as is caused by a target of constant velocity or by jamming, display apparatus comprising:
- first cathode ray tube (CRT) means synchronized with said readout and connected to said plurality of channels to display a plot of constant velocity target or jamming information against range;
- second CRT means synchronized with said readout and functioning to display a plot of non-constant velocity target information against range;
- third CRT means synchronized with said readout and functioning to display a plot of target acceleration information against range and
- circuit means connected between the discriminators and threshold devices in said plurality of channels and said second and third CRT means and functioning to produce signals which control the intensity and one directional position of the traces which produce the plots displayed by said second and third CRT means.

* * * * *